May 3, 1927.
C. M. STITT
PICTURE
Filed June 29, 1925
1,627,468
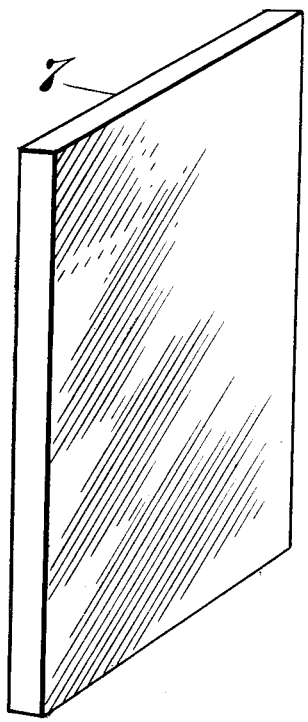
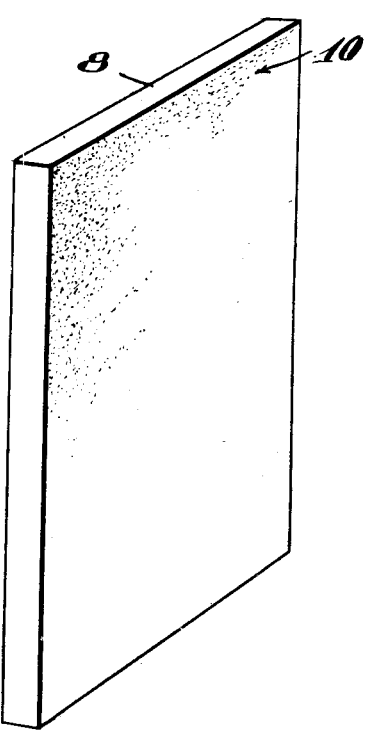
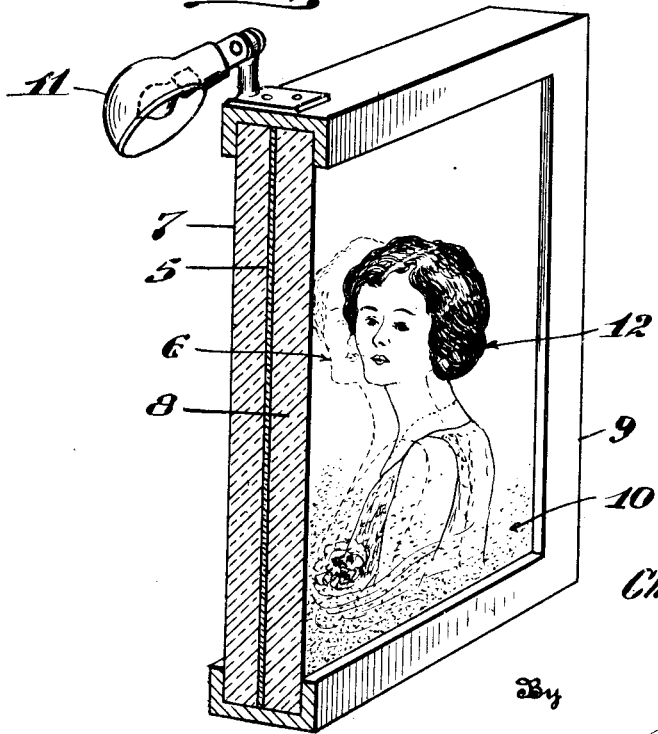
Inventor
Charles Monroe Stitt.
By R. S. Berry
Attorney Patented May 3, 1927.

1,627,468

UNITED STATES PATENT OFFICE.

CHARLES MONROE STITT, OF LOS ANGELES, CALIFORNIA, ASSIGNOR OF ONE-THIRD TO ALFRED McDONALD, OF LOS ANGELES, CALIFORNIA, AND ONE-THIRD TO WILLIAM J. REITER, OF SANTA MONICA, CALIFORNIA.

PICTURE.

Application filed June 29, 1925. Serial No. 40,228.

This invention relates to the display of pictures, especially those known as transparencies.

An object of the invention is to produce a novel and very attractive transparency.

A further object is to produce such a picture wherein the image will be made to appear in relief, or have a practically stereopticon effect.

Heretofore, in displaying transparencies, a transparent sheet carrying a picture has been disposed simply upon a clear transparent surface in a position to be between a source of light and the observer. The present invention lies primarily, in disposing a translucent, partially transparent surface, such as a frosted surface between the picture and the observer, so that a shadow or image of the picture is cast upon the translucent surface.

The invention resides in the novel arrangement and combination of parts disclosed in the drawings and described and pointed out in the appended claims, it being understood that the invention is limited only as defined by said claims.

In the drawings:

Fig. 1 represents a clear transparent sheet or panel such as a pane of glass;

Fig. 2 represents a transparent sheet carrying a picture;

Fig. 3 represents a sheet or panel such as a pane of glass having one surface frosted;

Fig. 4 is a perspective view showing the parts of Figs. 1, 2 and 3 assembled in use.

In carrying out my invention I employ a sheet 5 particularly shown in Fig. 2, which is primarily substantially transparent. Formed on this sheet or panel is a picture or image 6 to be exhibited and which picture is essentially translucent and is rendered in substantially natural colors, being preferably tinted with translucent paints, stains or dyes applied manually, but which, however, may be produced in any suitable manner to obtain the desired results.

In practice I prefer to employ a photographic film such as a sensitized flexible sheet of celluloid on which is reproduced by photographic process, a positive picture from a photographic negative, which is accomplished in the manner common to the production of positive photographic films or plates.

The colored translucent picture-carrying sheet 5 is interposed between a pair of plates 7 and 8 in superficial contact with the contiguous surfaces thereof, as particularly shown in Fig. 4, the sheet 6 being held in place between the plates 7 and 8 by means of a binder or frame 9 of any suitable construction, whereby the plates 7 and 8 are tightly clamped against the opposite sides of the sheet 5. The plate 7 is transparent, being preferably formed of clear glass, and the plate 8 is translucent, being preferably formed of a panel of glass, the outer surface of which plate is frosted or ground, as indicated at 10. The picture thus formed is designed to be interposed between an observer and a source of light 11 with the frosted or ground surface 10 of the plate 8 facing the observer so that radiations emitted from the source of light 11 will project the image 6 upon the ground surface of the plate 8, as indicated at 12 in Fig. 4; there being a transparent wall body between the ground surface 10 and the image on the sheet 5. The image on the ground surface 10 will appear to an observer somewhat larger than the image 6 and which latter will be seen dimly through the semitransparent or frosted surface of the plate 8, so that when viewed from a normal position the picture will appear to an observer to be in relief and thereby have a stereopticon effect and will have a very attractive and pleasing appearance. In order to obtain the desired effect it is essential that the ground or translucent surface 10 of the plate 8 be spaced from the picture on the sheet 5 in order to effect a slightly enlarged projection of the picture onto the translucent surface. This enlargement of the projected image however will be very slight so that when the picture is viewed from the front, that is toward the light radiations, the projected image and the natural image will be slightly out of register, yet be so nearly aligned as to blend or merge into each other, thus imparting to the viewed picture a blended and softened appearance not present in the image 6 on the sheet 5 when viewed apart from the translucent plate.

Any suitable source of light may be employed as occasion may require, either sunlight or artificial light being suitable.

In the combination of a flexible photographic print and its protecting and exhibiting means consisting of a clear glass and a frosted glass, arranged as recited, I have contributed to the art a means for preserving a valuable photographic print, against damage by handling or breakage and at the same time provide for its advantageous exhibition as either a clear transparency or a diffused transparency by its reversal and holding between the observer and a source of light.

I claim:—

1. Means for preserving and exhibiting photographic prints on flexible, transparent films, comprising a sheet of clear glass dimensioned to conform with the film and for disposition in contact with and covering one face of the film, a sheet of glass having one of its faces frosted, similarly dimensioned and for disposition in contact with and covering the other face of the film with its frosted face spaced from the film and outermost, and means for holding the sheets of glass and the film against relative movements.

2. As a new article of commerce, a flexible photographic film and a preserving and exhibiting means therefor comprising a clear transparent sheet covering one face of the film, a sheet having a clear face, a frosted face and clear between said faces, for covering the other face of the film with its frosted face outermost, and means for holding the sheets and film against relative movements, the flexible film providing a photographic print subject to minimum damage by breakage and the clear and frosted enveloping sheets providing selective clear or diffused exhibition of the photographic print.

CHARLES MONROE STITT.